3,255,010
TWO-COMPONENT DIAZOTYPE MATERIAL
Oskar Süs and Hans-Dieter Dötsch, Wiesbaden-Biebrich, Germany, assignors, by mesne assignments, to Keuffel & Esser Company, Hoboken, N.J.
No Drawing. Filed May 3, 1962, Ser. No. 192,073
Claims priority, application Germany, May 5, 1961, K 43,651
6 Claims. (Cl. 96—75)

The present invention relates to diazotype materials and refers, more particularly, to two-component diazotype materials and couplers for use therewith.

In diazotype copying processes the use of amides of 2-hydroxy-3-naphthoic acid as couplers in combination with p-aminobenzene diazo compounds has acquired a certain practical importance, particularly in the production of diazo copying coatings on films or papers with a lacquered surface. Because of their superior solubility, the amides of 2-hydroxy-3-naphthoic acid with aliphatic amines are preferred, particularly amides containing in the amide group at least one solubilizing group, e.g., a hydroxyalkyl group or a basically substituted alkyl group capable of salt formation.

Hitherto only amides of 2-hydroxy-3-naphthoic acid with primary aliphatic amines, i.e., amides with a free hydrogen atom on the carbonamide nitrogen, have been used for diazotype processes. These give strong-color copies with deep blue lines. A disadvantage of these couplers, however, is that in the presence of alkali, e.g., in the presence of the gaseous ammonia normally used for the development of two-component diazotype papers, they cause yellowing in the paper base or support, presumably because of salt-formation occurring at the free hydrogen atom of the carbonamide nitrogen. Hence prints are obtained with a strong yellow background which does not take on the white that is normally desired even after the prints have been left lying for some considerable time. For this reason the 2-hydroxy-3-naphthoic acid amides have been used as couplers only for light-sensitive diazotype coatings that are on a hydrophobic film, in which case neither the sensitizing solution nor the ammonia gas penetrates more than superficially into the supporting material.

The subject of the present invention is two-component diazotype material of high quality and long shelf-life whose exceptional qualities depend on the presence of certain 2-hydroxy-3-naphthoic acid amides as couplers in the light-sensitive coating. The two-component diazotype material in accordance with the present invention is characterized in that the light-sensitive coating contains as coupling component at least one amidated 2-hydroxy-3-naphthoic acid corresponding to the general formula

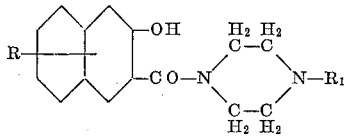

in which R stands for hydrogen, halogen, alkyl or alkoxy, and $R_1$ stands for hydrogen, alkyl, aralkyl or hydroxyalkyl, and contains as diazo component at least one diazo compound of the diazotized p-phenylene diamine type in which the nitrogen in the para position to the diazo group is secondary or tertiary.

The coupling components of the above general formula with which the present invention is concerned are obtained by the amidation of 2-hydroxy-3-napthoic acid, or of a corresponding substitution product, with a piperazine substituted on one side at a nitrogen atom by alkyl, hydroxyalkyl, aralkyl or by a group that can be split off by saponifying agents, the free hydrogen atom on the non-substituted nitrogen atom of the piperazine entering into reaction with the carboxyl group of the hydroxy-naphthoic acid. The resultant 2-hydroxy-3-naphthoic acid piperazides, in the form of their salts, have good water-solubility and when used as coupling components in two-component diazotype coatings in which p-aminobenzene diazo compounds are present give prints in deep blues to blue-blacks with pure white ground.

The presence of substituents in the naphthalene nucleus of 2-hydroxy-3-naphthoic acid piperazides in accordance with the above general formula has a favorable effect on the shade and power of the color of the prints produced with the diazotype material in accordance with the present invention. For example, a methoxy group causes a color displacement towards the blue. Halogen atoms make the dyestuffs absolutely water-resistant even when diazo compounds that give dyestuffs with strong tendencies to bleeding are used.

Through the present invention, the possibilities of use of amides of 2-hydroxy-3-naphthoic acids, which in general give azo dyestuffs with particularly strong colors, in diazotype copying are considerably extended and improved. The 2-hydroxy-3-naphthoic acid piperazides in accordance with the present invention belong to the less swiftly coupling couplers and can therefore be used in two-component layers in conjunction with diazo compounds with high coupling energy. Many of these diazo compounds give dyestuffs which are particularly fast to light and hence give high-quality prints.

If the 2-hydroxy-3-naphthoic acid piperazides of the present invention are used in two-component layers with p-amino-benzene diazo compounds which have two alkoxy groups in the benzene nucleus in para position such as have recently aroused much interest on account of their high light sensitivity, the light-sensitive material has very good shelf-life and gives copies and prints with deep blue lines. If they are used in the coating in conjunction with a yellow-coupling component, the blues can be adjusted to black.

A quality which is particularly to be recommended is the good resistance to water of the prints obtained from two-component diazotype materials of the present invention. With respect to water-resistance, these prints far surpass prints hitherto obtainable with the high-sensitivity diazotype material based on fast copying diazo compounds which is at present on the market for blues and blacks.

2-hydroxy-3-naphthoic acid piperazides to be used as couplers in accordance with the present invention for two-component diazotype material, may be prepared, for example, as follows: 2-hydroxy-3-naphthoic acid or its substitution product with the appropriate substituent is converted into the acid chloride and this is reacted with mono-alkyl piperazine in the presence of a non-reactive solvent. Production of the acid chloride is described in U.S. Patent 2,899,458. It is not necessary for the acid chloride to be isolated; the piperazides are obtained in good yield in a single-stage process if the piperazine base is added to the reaction solution obtained after the chlorination of the 2-hydroxy-3-naphthoic acid. The compounds are also obtainable by the reaction of the esters of 2-hydroxy-3-naphthoic acid and its derivatives with the piperazine bases, but this method is less suitable owing to the poorness of the yield obtained.

The examples herein are given for purposes of illustration, and it is to be understood that the invention is not limited to these examples.

*Example 1*

2 g. of 2-hydroxy-3-naphthoic acid-N-methylpiperazide and 2 g. of 1-diethylamino-3-ethoxybenzene-4-diazonium chloride (zinc chloride double salt) were added to a solution of 3 g. of citric acid
8 g. of thiourea
2 g. of triethyleneglycol
1 g. of boric acid
2 cc. of isopropyl alcohol in 80 cc. of water Water was added until the volume of the liquid amounted to 100 cc. The solution was filtered and used for the preparation of a diazotype coating on diazotype base paper. After the diazotype coating was exposed behind a transparent master, it was developed with ammonia gas and vivid blue positive copies of the master were obtained.

The 2-hydroxy-3-naphthoic acid-N-methyl piperazide with the formula

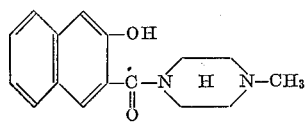

was prepared as follows:

37.6 g. (=0.2 mol) of 2-hydroxy-3-naphthoic acid were suspended in 75 cc. of methylene chloride. The suspension was treated with one to two drops of pyridine. With stirring, 23.8 (=0.2 mol) of thionyl chloride were added and the mixture was brought, under reflux, to boiling. In about one hour a clear solution was formed to which 20 g. (0.2 mol) of N-methyl piperazine were added dropwise. The solution was further stirred for a short time and then about 100 cc. of water were added. The mixture was made slightly acid with hydrochloric acid, so that the pH was about 3–4, and the methylene chloride was separated in a separating funnel. The aqueous phase was treated with about 45 cc. of 40% sodium hydroxide, cooled by the addition of pieces of ice, filtered over activated charcoal and adjusted to a pH of 7–7.5 by the dropwise addition of about 100 cc. of 50% acetic acid. 2-hydroxy-3-naphthoic acid-N-methyl piperazide precipitated out as a practically white product, was filtered off, washed with water and dried at 50–60° C. After recrystallization from a methanol/water mixture the compound melts at 221° C. The yield was 45 g., i.e., 84% of the theoretical.

Instead of 1-diethylamino-3-ethoxybenzene-4-diazonium chloride in the form of the zinc chloride double salt, the following diazo compounds were used, also in the form of the zinc chloride double salt, in the sensitizing solution given above, with equally good results:

1 - benzoylamino-2,5-diethoxybenzene-4-diazonium chloride (color of the resultant copy: blue-violet)
1-dimethylamino-2,5-diethoxybenzene-4-diazonium chloride (color of the resultant copy: brilliant blue)
1-morpholino-2,5-dimethoxybenzene-4-diazonium chloride (color of the resultant copy: vivid blue)
1-morpholino-2,5-diethoxybenzene-4-diazonium chloride (color of the resultant copy: vivid blue)
1-phenylaminobenzene-4-diazonium chloride (not used in the form of zinc chloride double salt; color of the resultant copy: violet black)

*Example 2*

The sensitizing solution was prepared as in Example 1, with 2.0 g. of 2-hydroxy-3-naphthoic acid-N-methyl piperazide as coupler and 2.0 g. of 1-benzoylamino-2,5-diethoxy-benzene-4-diazonium chloride (zinc chloride double salt) as diazo compound. From paper sensitized with this solution prints were obtained with blue violet lines the color of which is substantially the same as that obtained with the same diazo compound and 2-hydroxy-3-naphthoic acid-N-methyl piperazide (Example 1).

The 2-hydroxy-3-naphthoic acid-N-ethyl piperazide was prepared by the reaction of N-ethyl piperazine with 2-hydroxy-3-naphthoic acid chloride in a manner analogous to that described in Example 1. The compound is a white crystalline product with a melting point of 177° C.

*Example 3*

The coupler and diazo compound in the sensitizing solution described in Example 1 were replaced by 2.5 g. of 6-bromo-2-hydroxy-3-naphthoic acid-N-methyl piperazide and 2.0 g. of 1-phenylamino benzene-4-diazonium chloride. The solution was coated on diazotype base paper and dried. After the diazotype coating had been exposed and developed with ammonia gas, prints with violet black lines were obtained which were similar to the prints obtained with the same diazo compound and 2-hydroxy-3-naphthoic acid-N-methyl piperazide (Example 1). The dyestuff is absolutely waterproof.

The 6-bromo-2-hydroxy-3-naphthoic acid-N-methyl-piperazide, a white crystalline product, was prepared in a manner analogous to that described in Example 1, by the reaction of N-methyl-piperazine with 6-bromo-2-hydroxy-3-naphthoic acid chloride. It melts at 242° C.

*Example 4*

2.2 g. of 6-methoxy-2-hydroxy-3-naphthoic acid-N-methyl piperazide as coupler and 2.0 g. of 1-benzoyl-amino-2,5-diethoxybenzene-4-diazonium chloride (zinc chloride double salt) as diazo compound were dissolved in the sensitizing solution described in Example 1 instead of the coupler and diazo compound given therein. From paper sensitized with this solution prints with vivid blue lines were obtained because the —OCH$_3$ group present in the 2-hydroxy-3-naphthoic acid-N-methyl piperazide in 6-position causes a displacement of the color towards neutral blue.

The 6-methoxy-2-hydroxy-3-naphthoic acid-N-methyl piperazide was prepared, in a manner analogous to that described in Example 1, by the reaction of N-methyl-piperazine with 6-methoxy-2-hydroxy-3-naphthoic acid chloride. It melts at 225° C.

*Example 5*

2.1 g. of 2-hydroxy-3-naphthoic acid-N-hydroxyethyl piperazide, 0.3 g. of the yellow-coupling component bis-acetoacetyl ethylene diamine and 2.0 g. of 1-morpholino-2,5-diethoxy benzene-4-diazonium chloride (zinc chloride double salt) were dissolved in the sensitizing solution described in Example 1 instead of the quantities of coupler and diazo compound therein given. The sensitizing solution was coated upon diazotype base paper in the normal manner and dried. After the diazotype paper had been exposed under a master and developed with gaseous ammonia, prints with deep black lines were obtained.

The 2-hydroxy-3-naphthoic acid-N-hydroxyethyl piperazide was prepared, in analogous manner to that described in Example 1 by the reaction of N-hydroxyethyl piperazine and 2-hydroxy-3-naphthoic acid chloride. It melts at 184° C.

*Example 6*

2.0 g. of 2-hydroxy-3-naphthoic acid piperazide and 2.0 g. of 1-diethylamino-3-ethoxy-benzene-4-diazonium chloride (zinc chloride double salt) were dissolved in the sensitizing solution described in Example 1 instead of the coupler and diazo compound therein named. From the paper sensitized with this solution, prints with blue-black lines were obtained after exposure under a master and development. In comparison with the color obtained in Example 1, where the same diazo compound was used, the color produced with the coupler here used is displaced towards neutral blue.

The 2-hydroxy-3-naphthoic acid piperazide was prepared as follows:

One to two drops of pyridine were added to a suspension of 37.6 g. (=0.2 mole) of 2-hydroxy-3-naphthoic acid in 75 cc. of methylene chloride. Afterwards, 23.8 g. (=2 mol) of thionyl chloride were added and the mixture was boiled under reflux for about one hour with stirring.

A clear solution was obtained, to which 64 g. (0.4 mol) of piperazine-N-carboxylic acid ethyl ester were added dropwise.

The piperazine-N-carboxylic acid ethyl ester was prepared in accordance with the instructions given in the "Journal of the Chemical Society," London (1929) p. 42. The reaction mixture was extracted with 5% sodium hydroxide solution; the methylene chloride was separated and the aqueous phase was filtered over activated charcoal and acidified with hydrochloric acid. The precipitated 2-hydroxy-3-naphthoic acid piperazide-N-carboxylic acid ethyl ester was filtered off, washed with water and recrystallized from a methanol/water mixture. 46.5 g. of 2-hydroxy-3-naphthoic acid-N-carbethoxy piperazide with a melting point of 179° C. was obtained. 10 g. of this product were dissolved in 60 cc. of 10% sodium hydroxide solution and the solution was heated for about two hours to 90° C. The cooled solution was acidified with hydrochloric acid, filtered over activated charcoal and toned down to a pH value of 7.5 to 8 with 10% sodium carbonate solution. 2-hydroxy-3-naphthoic acid piperazide precipitated out. It was filtered off in ice-cold state and recrystallized from water. It has a melting point of 217° C.

*Example 7*

2.2 g. of 2-hydroxy-3-naphthoic acid-N-benzyl piperazide and 2.0 g. of 1-morpholino-2,5-dimethoxy-benzene-4-diazonium chloride (zinc chloride double salt) were added to a solution of 3 g. of citric acid
8 g. of thiourea
2 g. of triethyleneglycol
1 g. of boric acid
50 cc. of isopropyl alcohol in 30 cc. of water The solution was made up with water to a volume of 100 cc. This solution was coated upon a diazotype base paper lacquered with cellulose acetate. After the dried diazotype material had been exposed under a master and developed with ammonia gas, high-contrast prints with vivid blue lines were obtained. The prints show no real difference in shade from those produced as described in Example 1 with diazotype material containing the same diazo compound and 2-hydroxy-3-naphthoic acid-N-methyl piperazide. The vivid blue dyestuff, like the dyestuffs obtained with other diazo compounds, is absolutely water-proof.

For the preparation of the 2-hydroxy-3-naphthoic acid-N-benzyl piperazide the procedure was as follows:

A suspension of 37.6 g. (0.2 mol) of 2-hydroxy-3-naphthoic acid in 75 cc. of methylene chloride was treated first with one to two drops of pyridine and then with 23.8 g. (0.2 mol) of thionyl chloride. The mixture was boiled for one hour with stirring and to the now clear solution 35.2 g. (0.2 mol) of N-benzyl piperazine were added dropwise. After the reaction mixture cooled, the precipitate was filtered off, washed with a little methylene chloride and dissolved in hot dimethyl formamide. After the solution had been filtered over activated charcoal, water was added to the filtrate and the resultant precipitate was filtered off, washed with water and dried. 34 g. of a white crystalline product which after further recrystallization from dioxane melts at 212° C. was obtained.

It is apparent that the described examples are capable of many variations and modifications within the scope of the present invention. All such variations are to be included within the scope of the present invention.

What is claimed is:

1. A diazotype material, comprising a support, and a light-sensitive coating on said support, said light sensitive coating comprising a coupler, and a diazo component for coupling with said coupler for forming a visible color in the presence of an alkali environment, said coupler having the formula

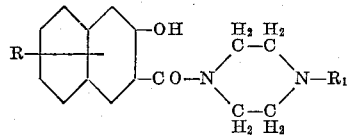

where R is a member selected from the group consisting of hydrogen, halogen, alkyl, and alkoxy, and $R_1$ is a member selected from the group consisting of hydrogen, alkyl, aralkyl, and hydroxy-alkyl.

2. A diazotype material, comprising a support, and a light-sensitive coating on said support, said light-sensitive coating comprising a coupler and a diazo component, said coupler being 6-bromo-2-hydroxy-3-naphthoic acid-N-methyl piperazide, and said diazo component being 1-phenylamino benzene-4-diazonium chloride.

3. A diazotype material, comprising a support, and a light-sensitive coating on said support, said light-sensitive coating comprising a coupler and a diazo component, said coupler being 6-methoxy-2-hydroxy-3-naphthoic acid-N-methyl piperazide, and said diazo component being 1-benzoylamino-2,5-diethoxybenzene-4-diazonium chloride (zinc chloride double salt).

4. A diazotype material, comprising a support, and a light-sensitive coating on said support, said light-sensitive coating comprising a coupler and a diazo component, said coupler being 2-hydroxy-3-naphthoic acid-N-hydroxyethyl piperazide, and said diazo component being 1-morpholino-2,5-diethoxy benzene-4-diazonium chloride (zinc chloride double salt).

5. A diazotype material, comprising a support, and a a light-sensitive coating on said support, said light-sensitive coating comprising a coupler and a diazo component, said coupler being 2-hydroxy-3-naphthoic acid piperazide, and said diazo component being 1-diethylamino-3-ethoxy-benzene-4-diazonium chloride (zinc chloride double salt).

6. A diazotype material, comprising a support, and a a light-sensitive coating on said support, said light-sensitive coating comprising a coupler and a diazo component, said coupler being 2-hydroxy-3-naphthoic acid-N-benzyl piperazide, and said diazo component being 1-morpholino-2,5-dimethoxybenzene-4-diazonium chloride (zinc chloride double salt).

References Cited by the Examiner

UNITED STATES PATENTS

| | | | |
|---|---|---|---|
| 2,551,570 | 5/1951 | Von Glahn et al. | 96—91 |
| 2,650,925 | 9/1953 | Ouperoff-Urne | 260—268 |
| 2,819,268 | 1/1758 | Baisses et al. | 260—268 |
| 2,875,205 | 2/1959 | Ruschig | 260—268 |
| 2,946,684 | 7/1960 | Sus et al. | 96—91 |
| 3,064,049 | 11/1962 | Cox | 260—560 |

J. TRAVIS BROWN, *Acting Primary Examiner.*

NORMAN G. TORCHIN, *Examiner.*

R. L. STONE, A. D. RICCI, *Assistant Examiners.*